(12) United States Patent
Kapala et al.

(10) Patent No.: US 12,060,805 B2
(45) Date of Patent: Aug. 13, 2024

(54) EJECTION TUBE INCORPORATED IN A CENTRAL VENTILATION TUBE

(71) Applicant: SAFRAN AIRCRAFT ENGINES, Paris (FR)

(72) Inventors: Patrick Edmond Kapala, Moissy-Cramayel (FR); Olivier Pascal Paul Chantoiseau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/551,906

(22) PCT Filed: Mar. 22, 2022

(86) PCT No.: PCT/FR2022/050526
§ 371 (c)(1),
(2) Date: Sep. 22, 2023

(87) PCT Pub. No.: WO2022/200729
PCT Pub. Date: Sep. 29, 2022

(65) Prior Publication Data
US 2024/0175378 A1    May 30, 2024

(30) Foreign Application Priority Data
Mar. 26, 2021 (FR) ..................................... 21 03109

(51) Int. Cl.
*F01D 25/30* (2006.01)
*F02C 7/06* (2006.01)
*B33Y 10/00* (2015.01)

(52) U.S. Cl.
CPC .............. *F01D 25/30* (2013.01); *F02C 7/06* (2013.01); *B33Y 10/00* (2014.12); *F05D 2260/605* (2013.01)

(58) Field of Classification Search
CPC . F01D 25/30; F02C 7/06; B33Y 10/00; F05D 2260/605
(Continued)

(56) References Cited

U.S. PATENT DOCUMENTS 4,755,103 A *  7/1988  Streifinger ............ F04D 29/063
                                                        384/473
9,988,942 B2 *  6/2018  Sultana ................... F01D 25/30
(Continued)

FOREIGN PATENT DOCUMENTS

FR      2 995 634 A1    3/2014
FR      2995634 A1 *    3/2014 ............. F01D 25/18

OTHER PUBLICATIONS

English Translation FR-2995634-A1 (Year: 2014).*
International Search Report issued Jun. 15, 2022 in PCT/FR2022/050526, filed on Mar. 22, 2022, 2 pages.

*Primary Examiner* — Shafiq Mian
(74) *Attorney, Agent, or Firm* — Oblon, McClelland, Maier & Neustadt, L.L.P.

(57) ABSTRACT

An upstream part of an air-discharge system for a turbomachine includes: a tube with an upstream end and a downstream end, and an internal tubular structure located inside the tube and configured to form therein a narrowing of its cross section. The internal tubular structure is made in one piece with the tube at the downstream end of the tube and is freely suspended at the upstream end of the tube. A turbomachine with a device for discharging air from the bearing chambers, in which the air is conducted towards the outside of the turbomachine by the air-discharge system is provided. A method for manufacturing the air-discharge system is provided.

12 Claims, 3 Drawing Sheets

(58) Field of Classification Search
USPC .............. 415/110–112, 122.1, 175, 176, 229
See application file for complete search history.

(56) References Cited

U.S. PATENT DOCUMENTS

| | | | |
|---|---|---|---|
| 2011/0146224 A1* | 6/2011 | Thies ...................... | F01D 25/18 |
| | | | 60/39.08 |
| 2018/0258851 A1* | 9/2018 | Ribarov .................. | F01D 25/32 |

* cited by examiner

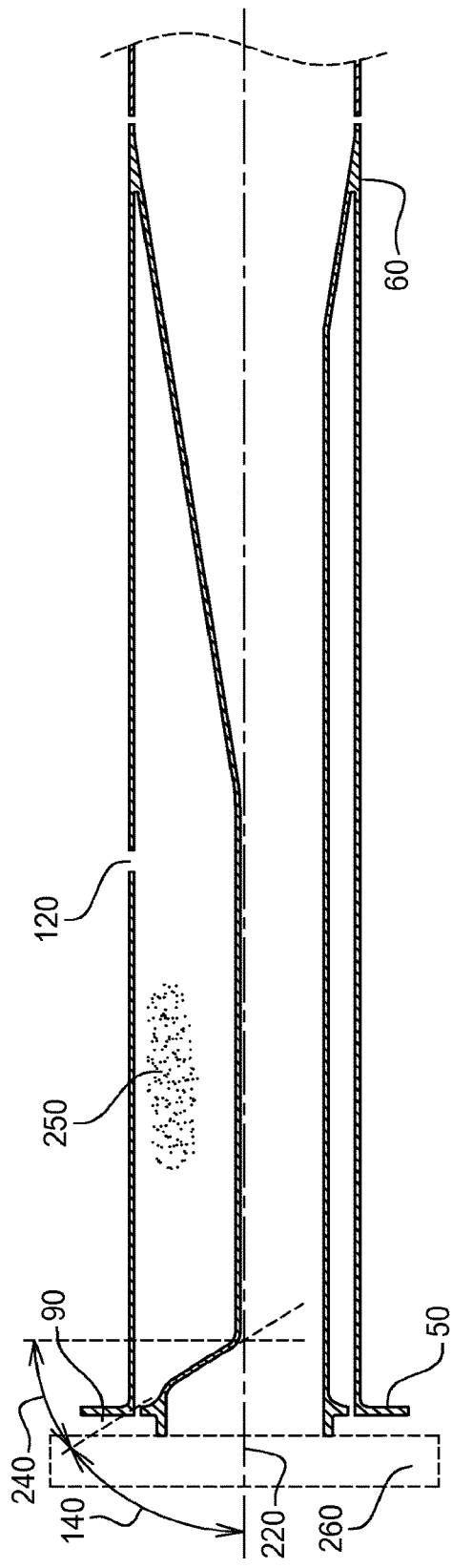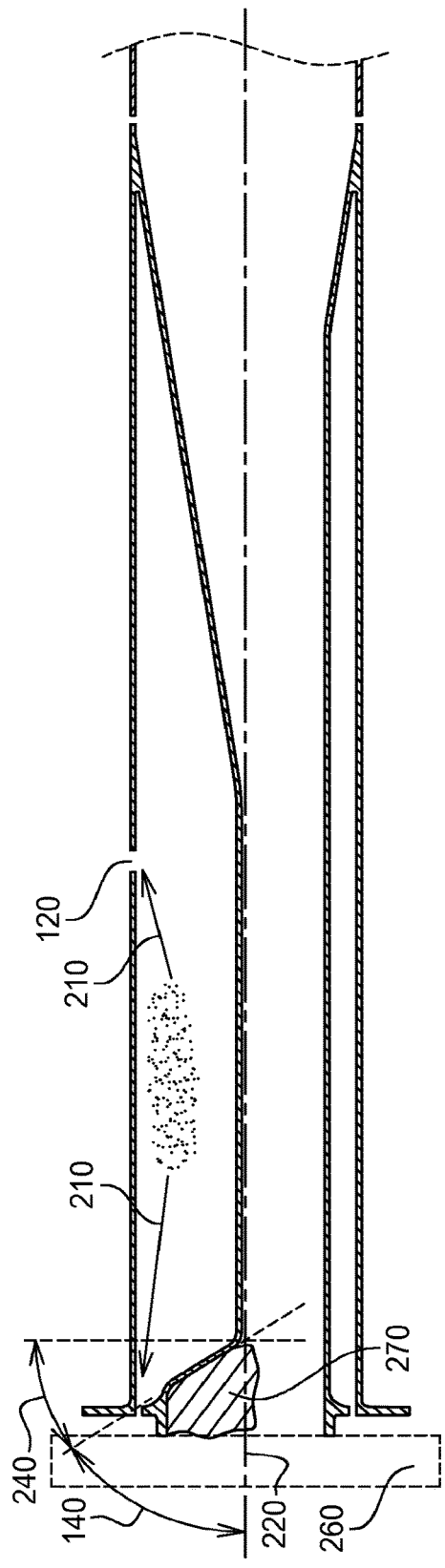

EJECTION TUBE INCORPORATED IN A CENTRAL VENTILATION TUBE

TECHNICAL FIELD AND PRIOR ART

The present invention relates to a central ventilation tube of a turbomachine.

A turbomachine, for example a turbojet engine, may comprise a discharge system configured to extract and channel pressurisation air from the bearing chambers and eject it to atmosphere. The discharge system normally comprises a central ventilation tube, wherein an internal tubular structure that forms a narrowing inside the central ventilation tube is positioned.

Vibrations and heating differences may cause cracks between the central tube and the internal tubular structure, resulting in damage to the discharge system. The tube and the internal tubular structure are two independent parts that are in contact. Static and vibratory stresses may lead to cracking of the internal tubular structure in the area of contact with the central ventilation tube, resulting in damage to the discharge system.

The present invention consequently proposes an air-discharge system with improved incorporation of the internal tubular structure in the central ventilation tube, as well as a method for manufacturing the system. The proposed discharge system incorporates the central ventilation tube and the internal tubular structure in a single part.

DESCRIPTION OF THE INVENTION

Consequently an aim of the present invention is to offer an upstream part (40) of an air-discharge system (20) for a turbomachine (30), comprising:
  a tube (70) with an upstream end (50) and a downstream end (60),
  an internal tubular structure (10) located in the interior (80) of said tube (70) and configured to form therein a narrowing of its cross section (170),
  the internal tubular structure (10) being made in one piece with the tube (10) at the downstream end (60) of the tube and freely suspended at the upstream end (50) of the tube.

Said upstream part can comprise a free space (90) formed between the tube (70) and the internal tubular structure (10) so that the tube and the internal tubular structure are connected solely at the downstream end, the tube and the internal tubular structure preferably being connected solely along a circumference of the downstream end.

According to one variant, said tube and the internal tubular structure may be separated by an annular slot (100) at the upstream end so that the internal tubular structure is freely suspended at the upstream end, the annular slot preferably having a size of 1.5 mm or more.

A wall (110) of the tube may comprise at least one opening (120) configured to make it possible to remove any non-melted powder located between the tube and the internal tubular structure.

Said tube (70) may have a cylindrical shape with a longitudinal axis (220), and a first angle (140) between a wall of the internal tubular structure (10) and the longitudinal axis may be 50° or less.

A thickness (150) of the wall (110) of the pipe and of the internal tubular structure may be between 0.8 mm and 1.2 mm.

The invention also relates to an air-discharge system, comprising
  said upstream part and
  an extension tube (160),
  the extension tube being connected to the downstream end of the tube (70) so as to form an extension thereof and to form a downstream part of the air-discharge system,
  the extension tube being connected to the tube (70) preferably by a weld (180).

In said air-discharge system, the extension pipe may comprise a material different from the material of the upstream part.

The present invention also relates to a turbomachine with a device (200) for discharging air from the bearing chambers,
  the air being conducted towards the outside of the turbomachine by an air-discharge system as presented above.

The invention also relates to a method for manufacturing an upstream part of an air-discharge system as previously presented, by powder bed laser fusion.

During said manufacturing method, the laser fusion can take place from the upstream end towards the downstream end.

The invention also relates to a method for manufacturing the air-discharge system previously presented, the method comprising the steps presented above and a step of assembling the extension pipe at the upstream part by a welding method.

BRIEF DESCRIPTION OF THE DRAWINGS

The present invention will be better understood on the basis of the following description and the appended drawings wherein:

FIGS. 4a and 4b show a cross-section of the upstream part of the central ventilation tube with a manufacturing support.

DETAILED DISCLOSURE OF PARTICULAR EMBODIMENTS

Figure 1:
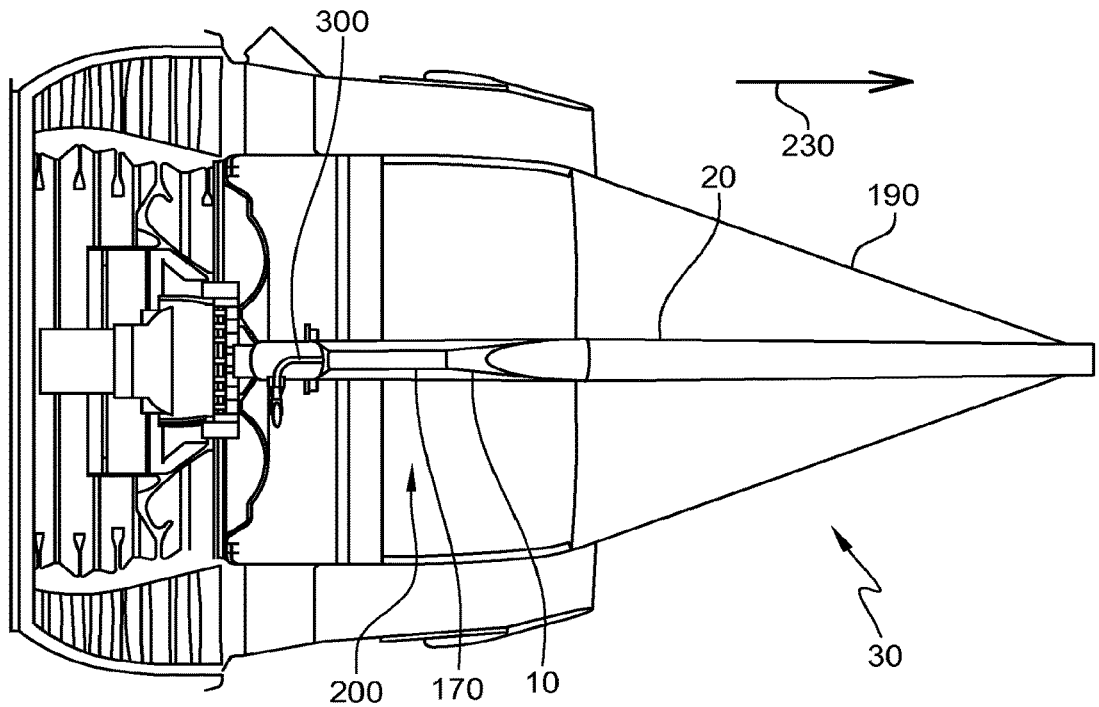
FIG. 1 shows a turbomachine comprising a device (200) for discharging air from the bearing chambers.

FIG. 1 shows a turbomachine comprising a device (200) for discharging air from the bearing chambers.

A turbomachine, for example a bypass turbojet engine, comprises an air inlet including a fan, the discharge air flow of which divides into an airflow that enters the engine and forms a hot flow or primary flow, and into an airflow that flows around the engine and forms a cold flow or secondary flow.

The engine typically comprises, from upstream to downstream, in the direction of flow of the gases, at least one compressor, a combustion chamber, at least one turbine, and an ejection device in which the combustion gases leaving the turbine and forming the primary flow are mixed with the secondary flow.

At its downstream end, the turbomachine comprises a cone (190) for ejecting the primary flow, or even the primary flow/secondary flow mixture. This cone has an elongated shape, the upstream end of which with the larger diameter is secured to an element of the turbomachine, such as a casing.

A central ventilation tube (20) passes longitudinally through the ejection cone (190). The function of this central ventilation tube (20) is to extract and channel the air with oil removed by the air-oil separators of the turbomachine and to eject it to atmosphere through the downstream end of the tube (20), located substantially at the downstream end of the ejection cone (190). Thus air from the bearing chambers of the turbomachine is conducted towards the outside by the central ventilation tube (20).

The central ventilation tube contains an internal tubular structure (10), which includes a narrowing (170), or in other words a cross-section with reduced diameter (170), in order to cause a Venturi effect for the air circulating in the internal tubular structure. A nozzle (300) brings purging air to this narrowing (170), which creates a low-pressure aspiration by Venturi effect, drawing the purging air from the nozzle in order then to eject it to outside. On this figure, as in FIG. 2, the direction of the airflow, from upstream to downstream in the turbomachine in operation, is indicated by an arrow 230.

Figure 2:
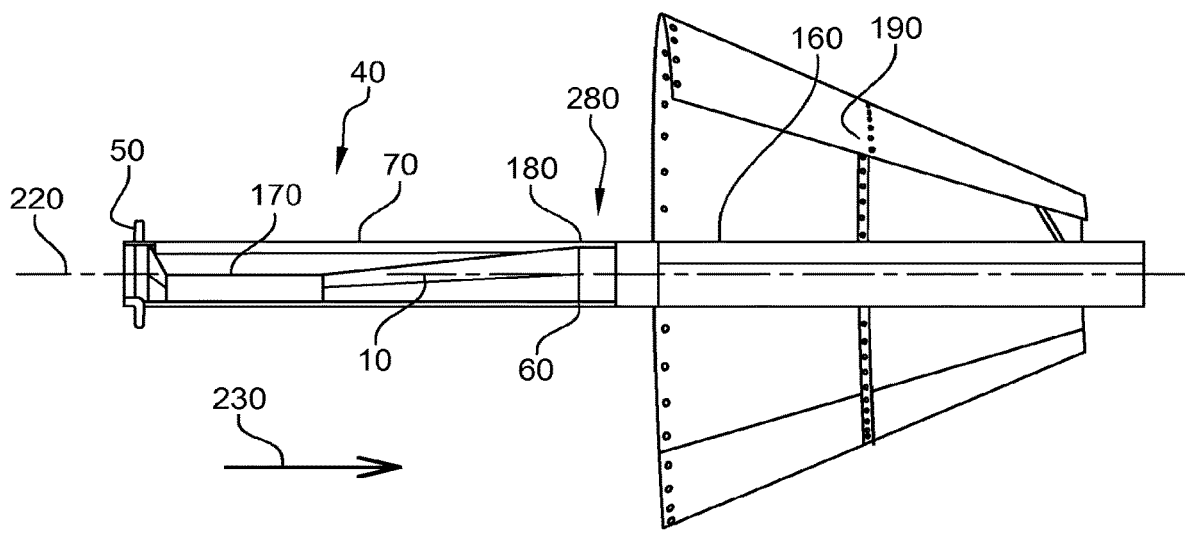
FIG. 2 shows a central ventilation tube located inside the ejection cone.

FIG. 2 shows the central ventilation tube (20) located inside the ejection cone (190). This tube comprises an upstream part (40) followed, downstream, by an extension tube (160), the inlet of which is indicated by the arrow 280. The upstream part (40) itself comprises an upstream end (50) and a downstream end (60).

The upstream part comprises a tube (70), preferably cylindrical in shape, having a longitudinal axis (220). The internal tubular structure (10) is located in the interior of this tube (70) and forms therein the narrowing (170).

The extension tube (160) is connected at the downstream end (60) of the upstream part (40) so as to form an extension of the tube (70). The extension tube can be connected to the upstream part (40) by a weld (180). In this case, the extension tube may comprise a material different from the material of the upstream part. For example, the latter may comprise a material particularly well adapted to manufacture by powder bed laser fusion or to another additive manufacturing method. The extension tube may comprise a material adapted to manufacture by other methods.

It can also be envisaged manufacturing the upstream part and the extension tube in a single piece, for example by a powder bed laser fusion method or another additive manufacturing method.

Figure 3A:
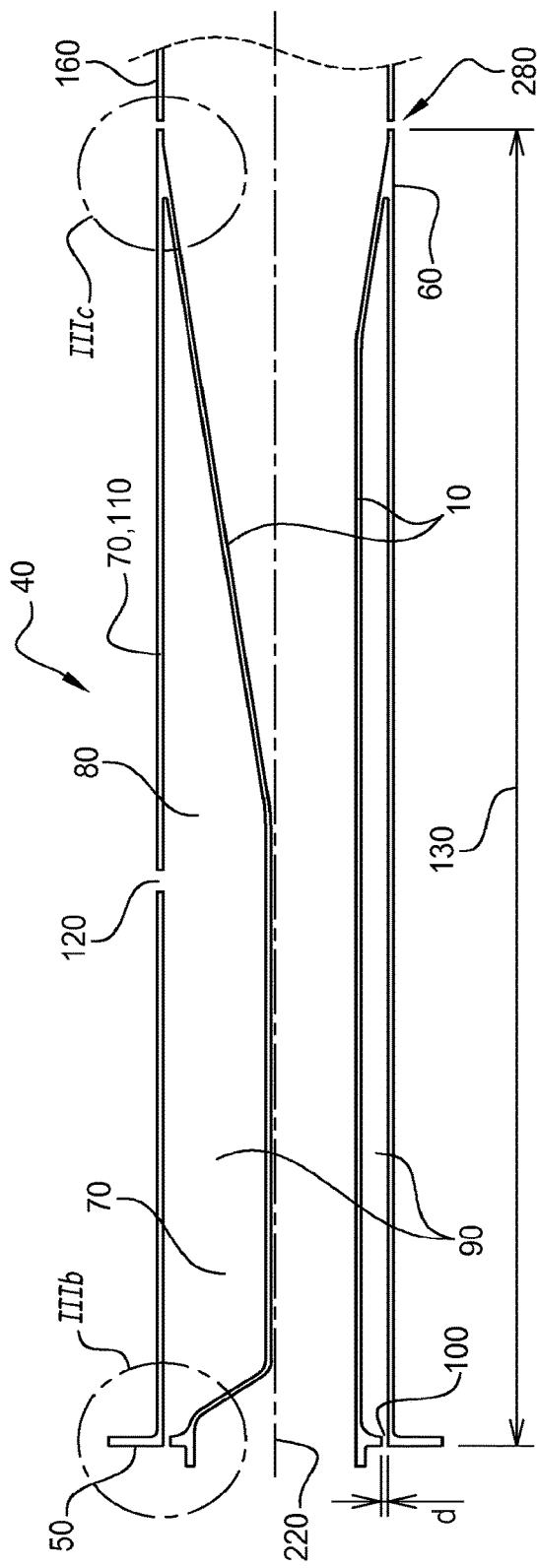
FIGS. 3a, 3b and 3c show a cross-section of the upstream part of the central ventilation tube.

FIG. 3*a* shows a cross-section, in a plane that contains the longitudinal axis (220) of the tube (70), of the upstream part (40) of the central ventilation tube (20) of FIG. 2. On this figure, the end (280) of the extension tube can also be seen, as well as the upstream part (40), comprising the tube (70) between the upstream end (50) and the downstream end (60). The tube can have a diameter of 78 mm. The internal tubular structure (10) forms the narrowing (170) in the interior (80) of the tube. In other words, air that enters through the upstream end (50) to leave through the downstream end must pass through a passage the cross section of which, with respect to the diameter of the tube, contracts first and then broadens out later. Advantageously, as illustrated in FIG. 3*a*, the narrowing (170) is asymmetrical with respect to the longitudinal axis (220) of the tube, or more precisely the narrowing is off-centre with respect to the longitudinal axis (220). In other words, the air that enters through the upstream end (50) is diverted from the longitudinal axis (220) by the asymmetrical narrowing. The asymmetrical form has the advantage of avoiding retention of oil upstream of the narrowing zone, which continuously ensures a flow of oil towards the outside.

Figure 3C:
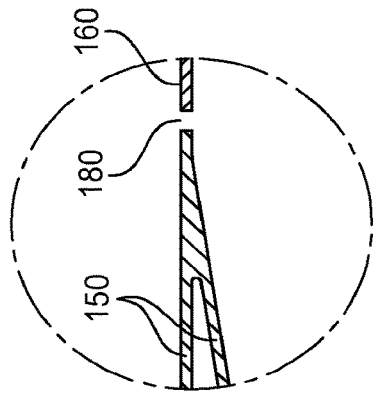

FIG. 3*c* shows an enlargement of the downstream end (60) of the internal tubular structure and of the tube. The internal tubular structure is made in one piece with the tube at the downstream end (60). In general terms, a first part "made" in one piece with a second part means that the first part and the second part are produced integrally and in a single piece. In other words, the internal tubular structure and the tube are produced integrally, or, at the downstream end, there is a continuity of material between a wall of the tube and a wall of the internal tubular structure. Preferably, the internal tubular structure is made in one piece with the tube over the entire circumference at the downstream end. In this way, the internal tubular structure and the tube are connected reliably and durably and the service life of the central ventilation tube is ensured.

Figure 3B:
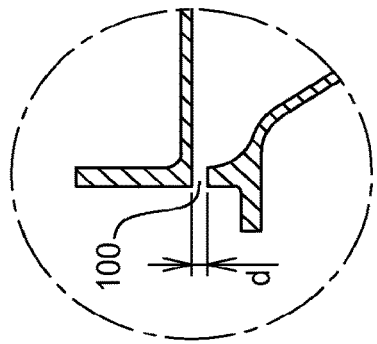

FIG. 3*b* shows an enlargement of the downstream end (40) of the central ventilation tube. The internal tubular structure is freely suspended at this end. In other words, at the upstream end, the internal tubular structure is not connected to the tube. The tube and the internal tubular structure are connected solely at the downstream end so as to leave a free space (90) between a wall (110) of the tube and the internal tubular structure. The tube and the internal tubular structure can be connected solely along the circumference of the downstream end. At the upstream end there is a space with a size d between the internal tubular structure and the tube, as illustrated in FIGS. 3*a* and 3*b*. This space can form an annular slot (100) at the upstream end so that the internal tubular structure is freely suspended therein. The annual slot can have a size of 1.5 mm or more. The free space (90) is in communication with the outside through the space left between the internal tubular structure and the tube or by the annular slot (100). The upstream part (40) is, in this way, particularly well adapted to manufacture in a single piece by a powder bed laser fusion method. Following this formation of the upstream part, the free space (90) is filled with powder that has not melted to form the walls (110) and other parts of this upstream part (40). This powder can be discharged to the outside through the space of size d, or the annular slot (100), as illustrated in FIGS. 3*a* and 3*b*. The tube and the internal tubular structure that are made in one piece at the downstream end and free at the upstream end are thus particularly well adapted to manufacture in a single piece, by a powder bed laser fusion method. Advantageously, the wall (110) of the tube and can comprise one or more lateral openings (120) configured to make it possible to remove the non-molten or non-fused powder.

The thickness (150) of the wall (110) of the tube and of the internal tubular structure may be 0.8 mm or 1 mm or 1.2 mm. It can also be envisaged having a thickness that varies between 0.8 mm and 1 mm or between 1 mm and 1.2 mm or between 0.8 mm and 1.2 mm. It is thus possible to select a thickness or several thicknesses for the upstream part of the central ventilation tube. A thickness between 0.8 mm and 1.2 mm is particularly well adapted for manufacture by powder bed laser fusion. The length (130) of the upstream part (40) of the central ventilation tube may be 600 mm or a shorter length, which is compatible with easy manufacture on a large number of powder bed laser fusion plants.

FIGS. 4*a* and 4*b* show a cross-section along the same plane as FIG. 3*a*. These figures also show a powder (250), located between the tube and the internal tubular structure, as well as a manufacturing support (260), which does not form part of the central ventilation tube. The reference 140 designates a first angle (140) of orientation of the wall of the internal tubular structure with respect to the longitudinal axis (220). The reference 240 designates an angle of orientation of the wall of the internal tubular structure with respect to an axis perpendicular to the longitudinal axis (220).

The manufacturing support (260) may be flat and support the manufacture of a flange (90) at the upstream end of the tube. During the formation of the flange, by powder fusion, the support provides a support for the material forming the flange, until it stiffens. In general terms, the support (260) facilitates the start of the construction of the part. The support (260) may be made from the same material as the part. In this case, the first grains of powder that form the flange are fused with the material of the support (260). In this case, the support must be separated from the part in the end, for example by machining.

Preferably, the first angle (140) between the wall and the longitudinal axis is 50° or less. In other words, the sum of the first angle and of the second angle being 90°, the second angle between the wall and a vertical axis is 40° or more. A first wall angle or a second wall angle between this range of values is particularly well adapted for manufacture by powder bed laser fusion. Said range of values is advantageous because a wall having a first angle of 50° or less with the longitudinal axis can be manufactured without adding material (270) between the part and the support (260), as shown on FIG. 4b.

Adding material (270) becomes necessary for a first angle of more than 50°. It is formed on the same side as the air inlet and stabilises the part or the wall during the powder fusion. The addition of material is next machined to form the wall. This block of material forming the addition of material (270) can be manufactured in material additive manufacturing, such as by powder fusion. The additional material can have parameters different from those of the part, such as for example a lower density. The lower density of the additional material with respect to the part facilitates machining, for example to form the wall.

Thus the entire part can be manufactured in a single piece, including the additions of material. In summary, it is necessary to distinguish the manufacturing support (260) making it possible to support the whole of the part from the very start of manufacture and any addition or additions of material (270) that may be necessary for manufacturing certain portions of the part because the manufacturing angle is too small.

The manufacturing method comprises the manufacture of the upstream part (40) in a single piece by a powder bed laser fusion method. Advantageously, this additive manufacturing by laser fusion begins with the formation of the upstream end and ends with the manufacture of the downstream end. The flange (90) can thus easily be manufactured at the start of the method, while bearing on the support (260). Alternatively, the manufacture may take place from the downstream end (60) towards the upstream end (50).

At the end of the laser fusion method, powder (250) remains in the free space (90) and must be removed. It is a case of powder not used for forming the walls. This powder can be removed (210) through the space provided between the tube and the internal tubular structure, located at the upstream end. The non-molten powder can be removed through the annular slot (100). Advantageously, powder can also emerge through the opening or openings (120) in the wall (110) of the tube.

The tube and the internal tubular structure are thus manufactured in a single piece by an additive method, preferably powder bed laser fusion as described above.

The upstream part by powder bed laser fusion can be produced from "Inconel 718" (registered trade mark). In a particular form, the Inconel 718 can comprise, in mass percentage, 50-55% Ni, 17-21% Cr, 15-21% Fe, 4.75-5.5% Nb, 2.8-3.3% Mo, 0.65-1.15% Ti and 0.2-0.8% Al. This material is particularly well adapted for manufacture by powder bed laser fusion.

The extension tube can also be produced from Inconel 718. Alternatively, the extension tube can be produced from "Inconel 625" (registered trade mark). In a particular form, the Inconel 625 can comprise, in mass percentage, Ni 58% or more, Cr 20-23%, Fe 5% or less, Mo 8-10%, Nb 3.15-4.15, Co 1% or less, Mn 0.5% or less, Al 0.4% or less, Ti 0.4% or less, Si 0.5% or less, C 0.1% or less, S 0.015% or less and P 0.015% or less.

The invention claimed is:

1. An upstream part of an air-discharge system for a turbomachine, comprising:
a tube with an upstream end and a downstream end; and
an internal tubular structure located in the interior of said tube and configured to form therein a narrowing of its cross section,
the internal tubular structure being made in one piece with the tube at the downstream end of the tube and freely suspended at the upstream end of the tube.

2. The upstream part according to claim 1, wherein:
a free space is formed between the tube and the internal tubular structure so that the tube and the internal tubular structure are connected solely at the downstream end, and
the tube and the internal tubular structure are connected solely along a circumference of the downstream end.

3. The upstream part according to claim 1, wherein:
the tube and the internal tubular structure are separated by an annular slot at the upstream end so that the internal tubular structure is freely suspended at the upstream end, the annular slot having a size of 1.5 mm or more.

4. The upstream part according to claim 1, wherein:
a wall of the tube comprises at least one opening configured to make it possible to remove any non-molten powder located between the tube and the internal tubular structure.

5. The upstream part according to claim 1, wherein:
the tube has a cylindrical shape with a longitudinal axis, and
a first angle between a wall of the internal tubular structure and the longitudinal axis is 50° or less.

6. The upstream part according to claim 1, wherein:
a thickness of the wall of the tube and of the internal tubular structure is between 0.8 mm and 1.2 mm.

7. An air-discharge system, comprising:
an upstream part according to claim 1; and
an extension tube,
the extension tube being connected to the downstream end of the tube so as to form an extension thereof and to form a downstream part of the air-discharge system,
the extension tube being connected to the tube by a weld.

8. The air-discharge system according to claim 7, wherein:
the extension tube comprises a material different from the material of the upstream part.

9. A turbomachine with a device for discharging air from the bearing chambers,
the air being conducted towards the outside of the turbomachine by an air-discharge system according to claim 7.

10. A method for manufacturing an upstream part of an air-discharge system according to claim 1, by powder bed laser fusion.

11. The manufacturing method according to claim 10, the laser fusion taking place from the upstream end towards the downstream end.

12. A method for manufacturing an air-discharge system according to claim 7, the method comprising manufacturing the upstream part of the air-discharge system by powder bed laser fusion, and assembling the extension tube at the upstream part by a welding method.

\* \* \* \* \*